United States Patent [19]

Dyott et al.

[11] Patent Number: 4,589,728
[45] Date of Patent: May 20, 1986

[54] OPTICAL FIBER POLARIZER

[75] Inventors: Richard B. Dyott, Orland Park, Ill.; Reinhard Ulrich, Buchholz, Fed. Rep. of Germany; John D. Meyer, Western Springs, Ill.

[73] Assignee: Andrew Corporation, Orland Park, Ill.

[21] Appl. No.: 526,553

[22] Filed: Aug. 26, 1983

[51] Int. Cl.$^4$ .................................................. G02B 6/14
[52] U.S. Cl. ............................ 350/96.30; 350/96.15; 350/96.29
[58] Field of Search ............. 350/96.1 S, 96.29, 96.30, 350/96.31, 96.34

[56] References Cited

U.S. PATENT DOCUMENTS

| | | | |
|---|---|---|---|
| 3,535,017 | 10/1970 | Miller | 350/96.30 |
| 3,711,262 | 1/1973 | Keck et al. | 65/3 |
| 4,106,847 | 8/1978 | Arnaud | 350/96.3 X |
| 4,179,189 | 12/1979 | Kaminow et al. | 350/96.33 |
| 4,240,694 | 12/1980 | Pan | 350/96.15 |
| 4,274,854 | 6/1981 | Pleibel et al. | 350/96.30 |
| 4,325,636 | 4/1982 | Schiffner | 350/96.15 |
| 4,354,736 | 10/1982 | Maklad et al. | 350/96.32 |
| 4,354,760 | 10/1982 | Schiffner | 350/96.15 |
| 4,386,822 | 6/1983 | Bergh | 350/96.15 |
| 4,410,236 | 10/1983 | Schiffner | 350/96.15 |
| 4,440,498 | 4/1984 | Sheem | 350/96.15 |
| 4,444,460 | 4/1984 | Stowe | 350/96.15 |
| 4,445,780 | 5/1984 | Burns | 350/96.15 |
| 4,461,536 | 7/1984 | Shaw et al. | 350/96.15 |
| 4,462,699 | 7/1984 | Shaw et al. | 350/96.15 |

FOREIGN PATENT DOCUMENTS 54-4153  1/1979  Japan ............................. 350/96.15

OTHER PUBLICATIONS

*Applied Optics*, vol. 14, No. 9, Sept. 1975, pp. 2194–2198, S. J. Ingrey, W. D. Westwood, Y. C. Cheng, and J. Wei, "Variable Refractive Index and Birefringent Waveguides by Sputtering Tantalum in $O_2$–$N_2$ Mixtures.
*Electronics Letters*, vol. 19, No. 16, Aug. 4, 1983, p. 601, R. B. Dyott, J. Bello, Polarization–Holding Directional Coupler Made from Elliptically Cored Fibre Having a D Section.
McMahon et al., "Fiber Optic Transducers": IEEE Spectrum, Dec. 1981, pp. 24–27.
MacChesney et al., "A New Technique for the Preparation of Low Loss and Graded Index Optical Fibers", Proceedings of the IEEE, 62 at 1280, 1974.
Tasker and French, "Low Loss Optical Waveguides with Prefused SiO2 Cores", Proceedings of the IEEE, 62 at 1281, 1974.
Ezekiel et al., "Fiber Optic Rotation Sensor . . . Review", No publication date—pp. 2–25.

(List continued on next page.)

*Primary Examiner*—John Lee
*Assistant Examiner*—Lester Rushin, III
*Attorney, Agent, or Firm*—Leydig, Voit & Mayer, Ltd.

[57] ABSTRACT

A fiber-optic polarizer comprising the combination of an optical fiber having a core and cladding with different refractive indices and forming a single-mode guiding region, the core having a non-circular cross-section defining two transverse orthogonal axes which, in combination with the different refractive indices, permit the de-coupling of waves polarized along the axes, the guiding region being located sufficiently close to the surface of the fiber, along a selected length of the fiber, to allow coupling to a contiguous medium, and the outer surface of the fiber having a non-circular cross-section with a predetermined geometric relationship to the guiding region and the orthogonal transverse axes so that the location of the guiding region and the orientation of the axes can be ascertained from the geometry of the outer surface. A polymeric film extends longitudinally along a selected length of the fiber and is coupled to the fiber surface that is closest to the core, the film having different indices of refraction along axes aligned with the transverse orthogonal axes of the core, one of the indices of refraction of the film being less than the effective index of refraction of a desired wave in the guiding region of the fiber, and the other index of refraction of the film being greater than the effective index of refraction of an unwanted wave in the guiding region of the fiber.

18 Claims, 5 Drawing Figures

OTHER PUBLICATIONS

Dyott, "Elliptically Cored . . . Fiber", Andrew Corp. Bulletin 8683, Proceedings of Int. Conf. on Fiber Optic Rotation Sensors, 11/81, pp. 1–4.

Schiffner et al., "Double Core . . . Directional Coupler", Applied Physics 23, pp. 41–45 (1980).

Eickoff, In-Line Fibre-Optic Polarizer, 8/26/80, Electronics Letters, vol. 16, No. 20, pp. 762–763.

Katsuyama, "Low Loss Single Fibres", 6/25/81, Electronics Letters, vol. 17, No. 13, pp. 473–474.

Davis, "An Introduction to Fiber Optic Sensors", Laser Focus/Fiberoptic Technology, Feb. 1982, vol. 18, No. 2, pp. 112–115.

Giallorenzii, "Fibre Optic Sensors", Optics and Laser Technology, 4/81, vol. 13, No. 2, pp. 73–78.

Cole et al, "Research Update . . . Sensors", International Fiber Optics and Communications, vol. 2, No. 2, 3/81, pp. 23–25.

Bergh et al, "All Single Mode . . . Gyroscope", Optics Letters, vol. 6, No. 4, 4/81, pp. 198–200.

OPTICAL FIBER POLARIZER

FIELD OF THE INVENTION

The present invention relates generally to the field of fiber optics and, more particularly, to fiber-optic polarizers.

DESCRIPTION OF THE PRIOR ART

Fiber optics is generally concerned with the transmission of light along a transparent fiber structure which has a higher refractive index than its surroundings. Currently it is possible to manufacture long, continuous strands of optical fiber which may propagate signals without substantial attenuation over long distances. It is also possible to manufacture the fiber structure as an optical waveguide wherein only preselected modes of light propagate in the fiber. By limiting wave propagation through the fiber to a single-mode, the bandwidth of the optical fiber may be exceedingly high to provide a high information-transfer capacity. Moreover, optical-fiber transmission equipment in compact, light-weight, and potentially inexpensive. Transmission over optical fibers does not generate interference and is unaffected by external interference.

While the development of optical fibers for telecommunications systems is becoming rather highly advanced, the use of fiber optics for sensing and control systems is still in its early development. In sensing and control systems a fiber-optic transducer is used that exploits either multimode or single-mode light propagation in an optical fiber.

While multimode sensors use amplitude variations in the optical signals to sense and transmit the desired information, single-mode sensors use phase variations rather than amplitude variations. The single-mode sensors usually involve mechanisms for altering such properties of the fiber as path length or index of refraction to effect the desired phase variations in the optical signal. In the case of the fiber-optic gyroscope, the single-mode sensor measures acceleration which inherently alters the propagation of light even though the fiber is not affected. Thus, in contrast to multimode sensors, in single-mode sensors the uniformity and mechanism of light propagation are especially critical.

Single mode sensors are also sensitive to the state of polarization of light in the fiber since, if the fiber is not significantly polarization-holding or preserving, waves of different polarization may have different phase velocities. Thus, for single-mode transducers, it is desirable to use elliptical-core or other kinds of polarization-holding fiber. See, e.g., McMahon et al., "Fiber-Optic Transducers," *IEEE Spectrum*, December 1981, pages 24–27.

Even in an optical fiber that has good polarization-holding properties, however, unwanted guided waves can be present. For example, in an optical fiber having a core with an elliptical cross-section, in which the desired wave is usually polarized along the major axis of the ellipse, an unwanted wave can be present and will be polarized along the minor axis of the ellipse. Such an unwanted wave can originate, for instance, from a laser source which launches imperfectly polarized light into the fiber or from coupling between polarizations in the fiber itself. Although such unwanted waves can be tolerated during transmission, they become extremely undesirable at the output end of the fiber where the phase of the desired wave is sensed and used for various purposes.

Dyott U.S. patent application Ser. No. 404,283, filed Aug. 2, 1982, entitled "Self-Aligning Optical Fiber With Accessible Guiding Region" and assigned to the assignee of the present invention, discloses a self-aligning optical fiber comprising a core and cladding having different refractive indices and forming a guiding region located close to the surface of the fiber along a selected length of the fiber. The core of the fiber has an elliptical cross-section, and the outer surface of the fiber has a non-circular (preferably D-shaped) cross-section with a predetermined geometric relationship to the elliptical core so that the orientation of the major and minor axes of the elliptical core can be ascertained from the geometry of the outer surface. The elliptical cross-section of the core in combination with the different refractive indices of the core and cladding permit the decoupling of waves polarized along such axes.

While an optical fiber of the type disclosed in the Dyott application permits the de-coupling of waves polarized along two transverse orthogonal axes, a separate polarizing device or polarizer is required to suppress the waveguide's ability to guide one of the two orthogonally polarized modes (e.g., the $_eHE_{11}$ mode) and to cause the waveguide to guide only the other mode (e.g., the $_oHE_{11}$ mode) and thereby limit the waveguide to true single-mode operation.

SUMMARY OF THE INVENTION

It is a principal object of the present invention to provide a fiber-optic polarizer which is easy and inexpensive to fabricate and yet has excellent performance characteristics. In this connection, one specific object of the invention is to provide such a polarizer that greatly reduces the amplitude of unwanted waves in a polarization-holding optical fiber.

Another important object of the present invention is to provide such an improved fiber-optic polarizer which can be easily coupled to the optical fiber carrying the polarized signal at any desired location along the length of the fiber.

Still another object of the invention is to provide such an improved fiber-optic polarizer which has little or no attenuating effect on the desired signal in the polarization-holding optical fiber.

A further object of the present invention is to provide an improved fiber-optic polarizer which provides stable operation under widely varying environmental conditions.

Other objects and advantages of the present invention will become apparent from the following detailed description and the accompanying drawings.

In accordance with the present invention, there is provided a fiber-optic polarizer comprising the combination of an optical fiber having a core and cladding with different refractive indices and forming a guiding region, the core having a non-circular cross-section defining two transverse orthogonal axes which, in combination with the different refractive indices, permit the de-coupling of waves polarized along the orthogonal axes, the guiding region being located sufficiently close to the surface of the fiber, along a selected length of the fiber, to allow coupling to a contiguous medium, the outer surface of the fiber having a non-circular cross-section with a predetermined geometric relationship to the guiding region and the orthogonal transverse axes so that the location of the guiding region and the orientation of the axes can be ascertained from the geometry of the outer surface, and polarizing means extending longitudinally along a selected length of the fiber and coupled to the fiber surface that is closest to the core, the polarizing means having different indices of refraction along axes aligned with the transverse orthogonal axes of the core, one of the indices of refraction of the fiber being less than the effective index of refraction of a desired wave in the guiding region of the fiber, and the other index of refraction of the film being greater than the effective index of refraction of an unwanted wave in the guiding region of the fiber. The effective index is defined as being equal to the ratio of the free space wavelength to that of the guided wave.

The polarizing means preferably comprises a polymeric film which is stretched along a first axis disposed in the plane of the film to increase the index of refraction of the film along that axis to a value above the effective index of refraction of the unwanted wave in the guiding region of the fiber, the film having a second index of refraction along a second axis that is perpendicular to the first axis, the second index of refraction being below the effective index of refraction of the desired wave in the guiding region of the fiber.

Figure 1:
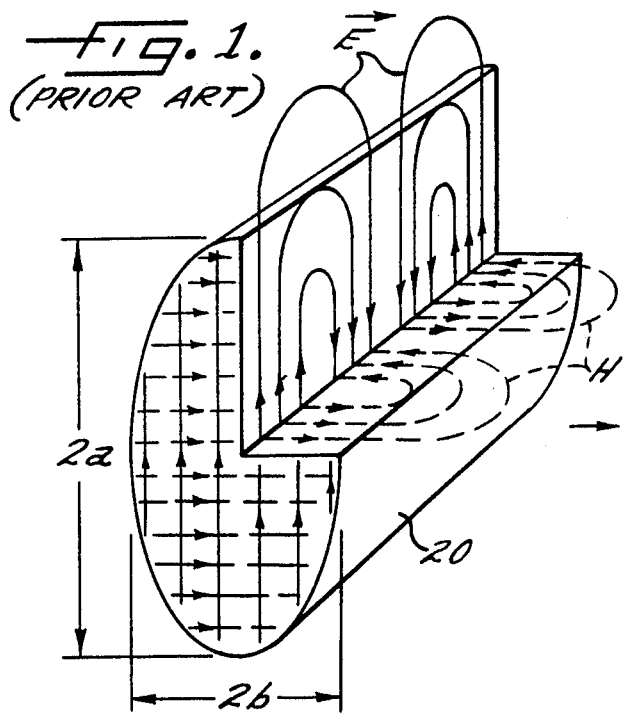
FIG. 1, labelled PRIOR ART, is a diagrammatic perspective view, in partial section, illustrating the electric and magnetic fields in their preferred directions of polarization in the elliptical core of a single-mode optical fiber waveguide.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1, there is shown a dielectric core 20 for supporting the propagation of electromagnetic fields $\overline{E}$, $\overline{H}$ in the axial direction. This particular core 20 has an elliptical cross-section with a major diameter $2a$ and a minor diameter $2b$. An optical fiber having such a core 20 with a relatively high dielectric constant/index of refraction tends to confine and guide electromagnetic energy (i.e., light) along the axis of the core. It is known that if the index of refraction of the core 20 is properly chosen in relation to the index of refraction of the surrounding medium, the core dimensions a, b, and the wavelength of the light, the distribution of the fields $\overline{E}$ and $\overline{H}$ will tend to occur in a well-defined pattern, or mode. Shown in FIG. 1 is the field pattern for the $_oHE_{11}$ mode.

Well-defined field patterns have the advantage of facilitating the coupling of the fiber to optical devices. Another advantage is that the attributes of the light propagation, such as phase velocity and group velocity, are relatively constant as the light propagates down the fiber. The group velocity specifies how fast modulation or information travels down the fiber. Thus, for transmitting information over long distances it is important that the group velocity be relatively constant and in particular independent of frequency so that the information will be localized at a specific region rather than becoming "smeared out" as the information travels down the fiber. A single phase velocity is important in fiber-optic sensor applications where the phase of a wave in a sensor fiber is compared to the phase of a reference wave in a reference fiber.

Single-mode propagation does not, however, guarantee that the polarization of a wave is fixed in any definite or constant angular relationship with respect to the core 20. Polarization is defined as the direction of the electric field vector $\overline{E}$. Thus, as shown in FIG. 1, the light is polarized in a vertical direction, along the major axis of the ellipse.

To maintain or preserve the polarization of a signal in an optical fiber, the optical properties of the fiber must be anisotropic, or in other words a function of the angle of polarization with respect to the fiber. One method of making the optical fiber anisotropic is to make the core 20 have a cross-section which is elliptical or some other non-circular shape which defines two transverse orthogonal axes permitting the de-coupling of waves polarized along those axes. A wave which is launched into such a fiber in alignment with one of the transverse axes tends to remain aligned with that axis as the wave is propagated through the fiber, thereby preserving the polarization of the wave.

Figure 2:
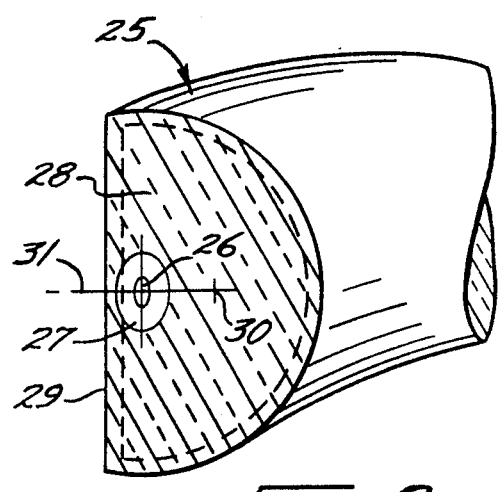
FIG. 2 is a perspective view of an optical fiber having an elliptical core as illustrated in FIG. 1.

In the illustrative embodiment of FIG. 2, an optical fiber 25 has an elliptical core 26 with a relatively high index of refraction $n_1$ surrounded by a cladding 27 with a lower index of refraction $n_2$. The dimensions and the refractive indices of the core 26 and the cladding 27 are selected to provide a region which will guide only the two fundamental $_oHE_{11}$ and $_eHE_{11}$ modes. Because of its elliptical shape, this guiding region will also hold the polarization of waves propagated therethrough in alignment with either axis of the ellipse. That is, the major and minor axes of the elliptical cross-section represent two transverse orthogonal axes which permit the de-coupling of waves polarized along those axes.

Surrounding the guiding region formed by the core 26 and cladding 27 is a support layer 28 which provides the fiber with increased mechanical strength and ease of manipulation. Since this support layer 28 is not a part of the guiding region, its optical properties are not nearly as critical as those of the core 26 and the cladding 27. To prevent light from being trapped in the cladding 27, the support layer has an index of refraction $n_3$ higher than that of the cladding 27.

As can be seen in FIG. 2, by removing a thin portion of the support layer 28, and also a portion of the cladding 27 if necessary to achieve the desired degree of coupling (e.g., by etching to the dashed contour in FIG. 2), the guiding region formed by the core 26 and cladding 27 can be located sufficiently close to the surface of the fiber to allow coupling to a contiguous medium by evanescent wave coupling. As an alternative, a selected segment of the fiber can be drawn to reduce the fiber diameter within that segment and thereby expand the field of the guiding region to permit the coupling of waves from the guiding region in that segment of the fiber.

The outer surface of the fiber as defined by the support layer 28 in FIG. 2 has a D-shaped cross-section, with the flat surface 29 of the D extending parallel to the major axis of the elliptical guiding region on the side of the fiber closest to the guiding region. This D-shaped optical fiber is easily interfaced to a polarization-sensitive optical device by using the flat surface 29 of the D as an indexing surface.

The guiding region of the D-shaped fiber 25 of FIG. 2 is preferably offset or displaced from the geometric center 30 (i.e., centroid of mass or center of gravity of the transverse section) toward the flat 29 of the D along the perpendicular-bisector 31 of the flat. Preferably, the guiding region is located within a few average core diameters of the flat surface 29 so that the outer surface of a portion of the fiber may be etched to expose the guiding region at the surface 29, thereby permitting the transmission or gradual exchange of light between the guiding region and the fiber surface. For example, the guiding region can be located within about three average core diameters of the flate surface 29. For the elliptical core 26, the average core diameter is the sum (a+b) of the major and minor radii.

The fact that the flat surface 29 of the D is within a few average core diameters of the guiding region does not affect the attenuation or loss of the fiber since the flat surface 29 is not within the cladding 27. Although there is some light propagated within the cladding 27, substantially no light reaches the support layer 28 which forms the flat 29 of the D. But if an etchant such as hydrofluoric acid is applied to the outer surface of the fiber along a selected length, the flat surface 29 will be moved inwardly (e.g., to the dashed contour shown in FIG. 2), thereby allowing light to be coupled between the core 26 and the flat surface 29 via the cladding 27.

In accordance with one important aspect of the present invention, a polymeric film is coupled to the flat side of the D-shaped optical fiber, the film having different indices of refraction along axes aligned with the orthogonal transverse axes of the elliptical core of the fiber, one of the indices of refraction of the fiber being less than the effective index of refraction of a desired wave in the guiding region of the fiber, and the other index of refraction of the film being greater than the effective index of refraction of an unwanted wave in the guiding region of the fiber. Thus, in the illustrative embodiment of FIG. 3 a polymeric film 40 has one edge 41 thereof extending longitudinally along the fiber 25 and coupled to the flat surface 29. The desired coupling between the film edge 41 and the flat fiber surface 29 can be achieved by merely pressing the fiber against the film edge 41, i.e., without any intermediate coupling medium. On the other hand, an intermediate coupling medium, such as a liquid or gel with the proper index of refraction, may be utilized if desired.

Figure 3:
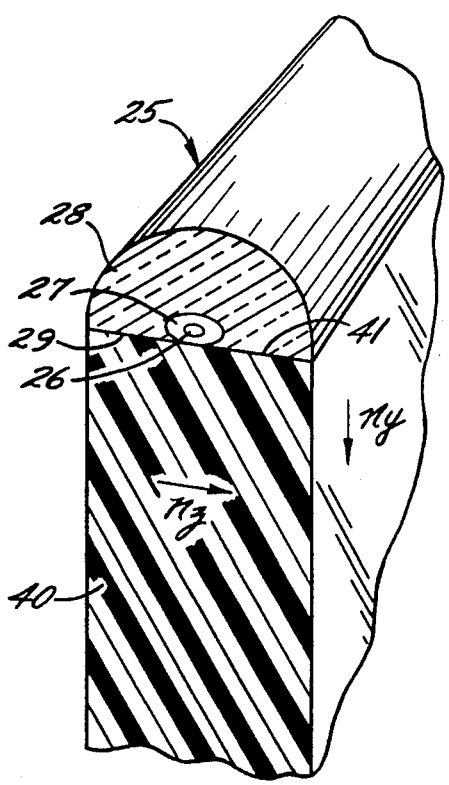
FIG. 3 is a perspective view of a fiber-optic polarizer according to one preferred embodiment of the present invention.

As indicated by the legends in FIG. 3, the polymeric film 40 is birefringent in that it has different indices of refraction $n_y$ and $n_z$ along orthogonal axes which are perpendicular to the major and minor axes of the elliptical cross section of the fiber core 26. The axis of the index $n_y$ lies within the plane of the film 40 and is perpendicular to the film edge 41 coupled to the flat fiber surface 29. The axis of the index $n_z$ extends across the thickness of the film, perpendicular to both the plane of the film 40 and the axis of the index $n_y$.

By coupling the plastic film 40 to the flat side 29 of the D-shaped fiber, the anisotropic indices of refraction of the film can be properly aligned with the orthogonal axes of polarization in the fiber core 26 so that only the wave with the desired polarization is retained in the fiber core. Normally the desired wave is polarized along the major axis of the elliptical cross-section of the fiber core 26. The wave with this desired polarization in the fiber core, e.g. the wave propagating in the $_oHE_{11}$ mode, is retained in the fiber 25 by providing the plastic film 40 with an index of refraction $n_z$, along an axis parallel to the major axis of the elliptical core 26 less than the effective index of refraction $n_e$ of the desired wave in the guiding region of the fiber.

The unwanted waves in the optical fiber 25 are those polarized along the minor axis of the elliptical core 26. As is well known, the evanescent fields in the fiber cladding 27 can be used to couple waves from the fiber 25. In this particular case, the wave having the unwanted polarization, e.g. that propagating in the $_eHE_{11}$ mode, is coupled from the fiber by providing the polymeric film 40 with an index of refraction $n_y$, along an axis parallel to the minor axis of the elliptical core 26, greater than the effective index of refraction $n_e$ of the unwanted wave in the guiding region of the fiber. This value of the refractive index $n_y$ causes the unwanted wave to radiate into the film 40 and thereby escape from the fiber 25.

As a practical matter, the values of the refractive indices $n_z$ and $n_y$ will generally be selected to be less than and greater than, respectively, the refractive induces of both the fiber core 26 and the cladding 27.

The use of a polymeric film is particularly advantageous because the axes of the anisotropic indexes of refraction are precisely known relative to the physical shape of the film, and the value of one or more of the anisotropic indices of refraction can be easily adjusted by simply stretching the film along the axis or axes of the index or indices that it is desired to change. Thus, it is relatively simple and inexpensive to arrive at exactly the desired values of the anisotropic indices of refraction along orthogonal axes in the plastic film, and to precisely align those axes with the orthogonal axes of the elliptical cross section of the fiber core. Consequently, polarizers with excellent performance characteristics can be fabricated easily and at a low cost.

For example, referring to FIG. 3, a film 40 can be selected with an index of refraction $n_z$ smaller than the effective index $n_e$ of the desired wave. This film 40 is then stretched in a direction perpendicular to the major axis of the elliptical core so as to increase the index $n_y$ above the effective index $n_e$ of the unwanted wave. Then when the stretched film 40 is coupled to the flat side of the D-shaped fiber 25, the desired polarizing effect is achieved. That is, any wave polarized along the minor axis of the elliptical core radiates out of the fiber 25 into the film 40, leaving only the desired wave polarized along the major axis of the elliptical core.

The polymeric film 40 may have virtually any composition that is capable of providing the requisite birefringence. Because the film need not serve as a light transmission medium, its optical transmission properties are insignificant. One film that has been successfully used in the illustrative polarizer is "Tedlar 400/BG/20/SE", which is a polyvinylfluoride film made by the duPont Company of Wilmington, Del.

Figure 4:
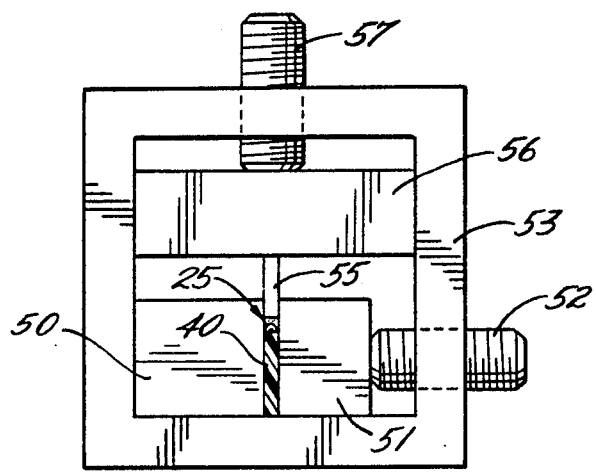
FIG. 4 illustrates a practical device incorporating the polarizer of FIG. 2.
Figure 5:
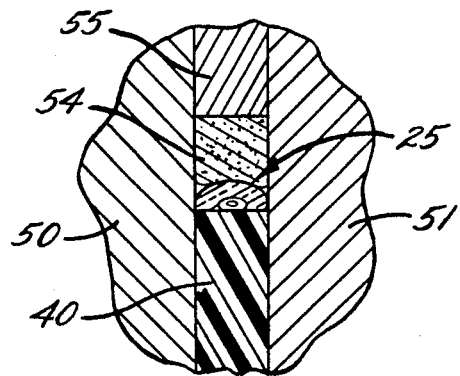
FIG. 5 is an enlarged fragmentary view of the central portion of FIG. 4.

FIGS. 4 and 5 illustrate a practical device embodying the polarizer of FIG. 3. In this device the polymeric film 40 is rigidly supported between a pair of metal blocks or plates 50 and 51 which can be pressed toward each other by means of a screw 52 bearing on the right-hand side of the block 51. The screw 52 is threaded through a rectangular housing 53 which also serves to support the blocks 50 and 51.

The flat surface 29 of the optical fiber 25 is placed against the top edge of the plastic film 40 held between the blocks 50, 51. The fiber 25 is pressed downwardly by a resilient pad 54 on the bottom of a tongue 55 extending downwardly from a metal block 56. To apply downward pressure on the fiber 25, a screw 57 is threaded through the top of the housing 53 and coupled to the top of the block 56. The tongue 55 has about the same thickness as the fiber 25 and the film 40, which is typically about 70 microns.

It will be appreciated that the tongue 55 depending from the metal block 56 not only serves to transfer the desired downward pressure from the screw 57 to the top of the fiber 25, but also serves as a spacer between the two lower blocks 50 and 51 to prevent any damage to the optical fiber 25.

If it is desired to retain the optical wave which is polarized along the minor axis, rather than the major axis, of the elliptical cross section of the fiber core, the relationships of the refractive indices of the polymeric film to the effective indices of refraction of the desired and unwanted waves, respectively, are simply reversed. That is, the refractive index $n_z$ of the film must be smaller than the effective index of refraction of the desired wave, which is now the wave polarized along the minor axis of the ellipse; and the index $n_y$ must be greater than the effective index of refraction of the unwanted wave, which is now the wave polarized along the major axis of the ellipse.

In an alternative arrangement the flat surface of the D-shaped fiber is placed in contact with the plane surface of a birefringent plastic film which has a first refractive index in the plane of the film smaller than the effective refractive index of the desired guided wave, and a second refractive index also in the plane of the film but in a direction orthogonal to that of the first index and greater than the effective refractive index of the unwanted guided wave. In another arrangement the D fiber is constructed with the flat surface of the D-shaped fiber parallel to the minor axis of the elliptical core.

Although it is particularly advantageous to form the polarizer of the invention from a plastic film, as described above, other materials having anisotropic indices of refraction may be used in place of the film for certain applications. One such material is a birefringement crystal of potassium pentaborate, which has different indices of refraction along different axes therein.

As can be seen from the foregoing detailed description, this invention provides a fiber-optic polarizer which is easy and inexpensive to fabricate and yet has excellent performance characteristics. This polarizer greatly reduces the signal level of unwanted signals in a single-mode polarization-holding optical fiber, and yet it has little or no attenuating effect on the desired signal in the optical fiber. This improved polarizer can be easily coupled to the optical fiber carrying the polarized signal at any desired location along the length of the fiber. It also provides stable operation under widely varying environmental conditions.

We claim as our invention:

1. A fiber-optic polarizer comprising the combination of
    an optical fiber having a core and cladding with different refractive indices and forming a single-mode guiding region,
        said core having a non-circular cross-section defining two transverse orthogonal axes which, in combination with said different refractive indices, de-couple waves polarized along said axes,
        said guiding region being offset from the center of gravity of the fiber and located sufficiently close to the surface of one side of the fiber, along a selected length of the fiber, to expose the evanescent field of the guiding region at the surface of said one side to allow coupling to a contiguous medium,
        the outer surface of the fiber having a non-circular cross-section with a predetermined geometric relationship to said guiding region and said orthogonal transverse axes so that the location of said guiding region and the orientation of said axes can be ascertained from the geometry of said outer surface and
    a polymeric film extending longitudinally along a selected length of said fiber on said one side thereof and coupled to the evanescent field exposed at the fiber surface on said one side, said film having different indices of refraction along axes aligned with the transverse orthogonal axes of said core, the index of refraction that is aligned with the axis of polarization of a desired wave in said fiber being less than the effective index of refraction of said desired wave in said guiding region of said fiber, and the other index of refraction of said film being greater than the effective index of refraction of an unwanted wave in said guiding region of said fiber, said unwanted wave having an axis of polarization orthogonal to the axis of polarization of said desired wave.

2. A fiber-optic polarizer as set forth in claim 1 wherein said film extends away from the guiding region of the fiber in a prescribed plane, the index of refraction of the film that is greater than the effective index of refraction of said unwanted wave extends along an axis lying in the plane of the film, and the index of refraction of the film that is less than the effective index of refraction of said desired wave extends along an axis orthogonal to said prescribed plane.

3. A fiber-optic polarizer as set forth in claim 1 wherein said core has an elliptical cross-section.

4. A fiber-optic polarizer as set forth in claim 3 wherein the index of refraction of said film along an axis parallel to the major axis of said elliptical core is less than the effective index of refraction of said desired wave, and the index of refraction of said film along an axis parallel to the minor axis of said elliptical core is greater than the effective index of refraction of said unwanted wave.

5. A fiber-optic polarizer as set forth in claim 3 wherein the portion of said outer surface that is closest to said guiding region is substantially parallel to the major transverse axis of said elliptical cross-section.

6. A fiber-optic polarizer as set forth in claim 1 wherein said fiber includes a support layer surrounding said guiding region and forming said non-circular outer surface of the fiber.

7. A fiber-optic polarizer as set forth in claim 6 wherein said index of refraction that is greater than the effective index of refraction of said unwanted wave is greater than that of said cladding and said core.

8. A fiber-optic polarizer as set forth in claim 1 wherein the outer surface of said fiber has a generally D-shaped cross-section.

9. A fiber-optic polarizer as set forth in claim 1 further including a pair of rigid plates disposed on opposite sides of said fiber and said film and rigidly supporting said film.

10. A fiber-optic polarizer comprising the combination of
an optical fiber having a generally flat surface and a core of generally elliptical cross-section located adjacent said flat surface, said core having orthogonal major and minor transverse axes and being located with one of said transverse axes extending generally perpendicular to said flat side of said fiber, said core being located sufficiently close to said flat surface to expose the evanescent field of the core at said flat surface, and
a polymeric film having one edge extending longitudinally of the fiber and coupled to the evanescent field exposed at said flat surface of the fiber, said film having different indices of refraction along axes aligned with the orthogonal transverse axes of said elliptical core, the index of refraction that is aligned with the axis of polarization of a desired wave in said fiber being less than the effective index of refraction of said desired wave in said fiber, and the other index of refraction of said film being greater than the effective index of refraction of an unwanted wave in said said fiber, said unwanted wave having an axis of polarization orthogonal to the axis of polarization of said desired wave.

11. A fiber-optic polarizer as set forth in claim 10 wherein the index of refraction of the film that is greater than the effective index of refraction of said unwanted wave extends along an axis lying in the plane of the film, and the index of refraction of the film that is less than the effective index of refraction of said desired wave extends along an axis passing through the thickness of the film.

12. A fiber-optic polarizer as set forth in claim 10 wherein the index of refraction of said film along an axis parallel to the major axis of said elliptical core is less than the effective index of refraction of said desired wave, and the index of refraction of said film along an axis parallel to the minor axis of said elliptical core is greater than the effective index of refraction of said unwanted wave.

13. A fiber-optic polarizer as set forth in claim 10 wherein said flat surface of said fiber is substantially parallel to the major transverse axis of said elliptical cross-section.

14. A fiber-optic polarizer as set forth in claim 10 further including a pair of rigid plates disposed on opposite sides of said fiber and said film and rigidly supporting said film.

15. A fiber-optic polarizer comprising the combination of
an optical fiber having a core and cladding with different refractive indices and forming a single-mode guiding region,
said core having a non-circular cross-section defining two transverse orthogonal axes which, in combination with said different refractive indices, decouples waves polarized along said axes,
said guiding region being offset from the center of gravity of the fiber and located sufficiently close to the surface of one side of the fiber, along a selected length of the fiber, to expose the evanescent field of the guiding region at the surface of said one side to allow coupling to a contiguous medium,
the outer surface of the fiber having a non-circular cross-section with a predetermined geometric relationship to said guiding region and said orthogonal transverse axes so that the location of said guiding region and the orientation of said axes can be ascertained from the geometry of said outer surface and
polarizing means extending longitudinally along a selected length of said fiber on said one side thereof and coupled to the evanescent field exposed at the fiber surface on said one side, said polarizing means having different indices of refraction along axes aligned with the transverse orthogonal axes of said core, the index of refraction that is aligned with the axis of polarization of a desired wave in said fiber being less than the effective index of refraction of said desired wave in said guiding region of said fiber, and the other index of refraction of said polarizing means being greater than the effective index of refraction of an unwanted wave in said guiding region of said fiber, said unwanted wave having an axis of polarization orthogonal to the axis of polarization of said desired wave.

16. A method of polarizing signals in an elongated optical fiber comprising a core and cladding having different refractive indices and forming a single-mode guiding region,
said core having a non-circular cross-section defining two transverse orthogonal axes which, in combination with said different refractive indices, decouple waves polarized along said axes,
said guiding region being offset from the center of gravity of the fiber and located sufficiently close to the surface of one side of the fiber, along a selected length of the fiber to expose the evanescent field of the guiding region at the surface of said one side to allow coupling to a contiguous medium,
the outer surface of the fiber having a non-circular cross-section with a predetermined geometric relationship to said guiding region and said orthogonal transverse axes so that the location of said guiding region and the orientation of said axes can be ascertained from the geometry of said outer surface, said method comprising the steps of
stretching a polymeric film along a first axis disposed in the plane of the film to increase the index of refraction of the film along said first axis to a value above the effective index of refraction of an unwanted wave in said guiding region, said film having a second index of refraction along a second axis that is perpendicular to said first axis, said second index of refraction being below the effective index of refraction of a desired wave in said guiding region, and
locating the film with one edge thereof extending longitudinally of the fiber and coupled to the evanescent field exposed at the fiber surface on said one side of the fiber, with said first axis disposed generally parallel to the minor axis of the elliptical corss section of said core and with said second axis disposed generally parallel to the major axis of the elliptical cross-section of said core.

17. The method of claim 16 wherein said core has an elliptical cross-section and said film is stretched along an axis parallel to the minor axis of said elliptical core so that the index of refraction of said film along their axis is greater than the effective index of refraction of said unwanted wave.

18. The method of claim 16 wherein the stretching of said film produces an index of refraction of said film higher than that of said cladding and said core.

* * * * *